Dec. 9, 1924.  1,519,014
W. WATSON ET AL
IMPROVER FOR FLOUR FOR BAKING BREAD AND METHOD OF MAKING
Filed Aug. 25, 1921
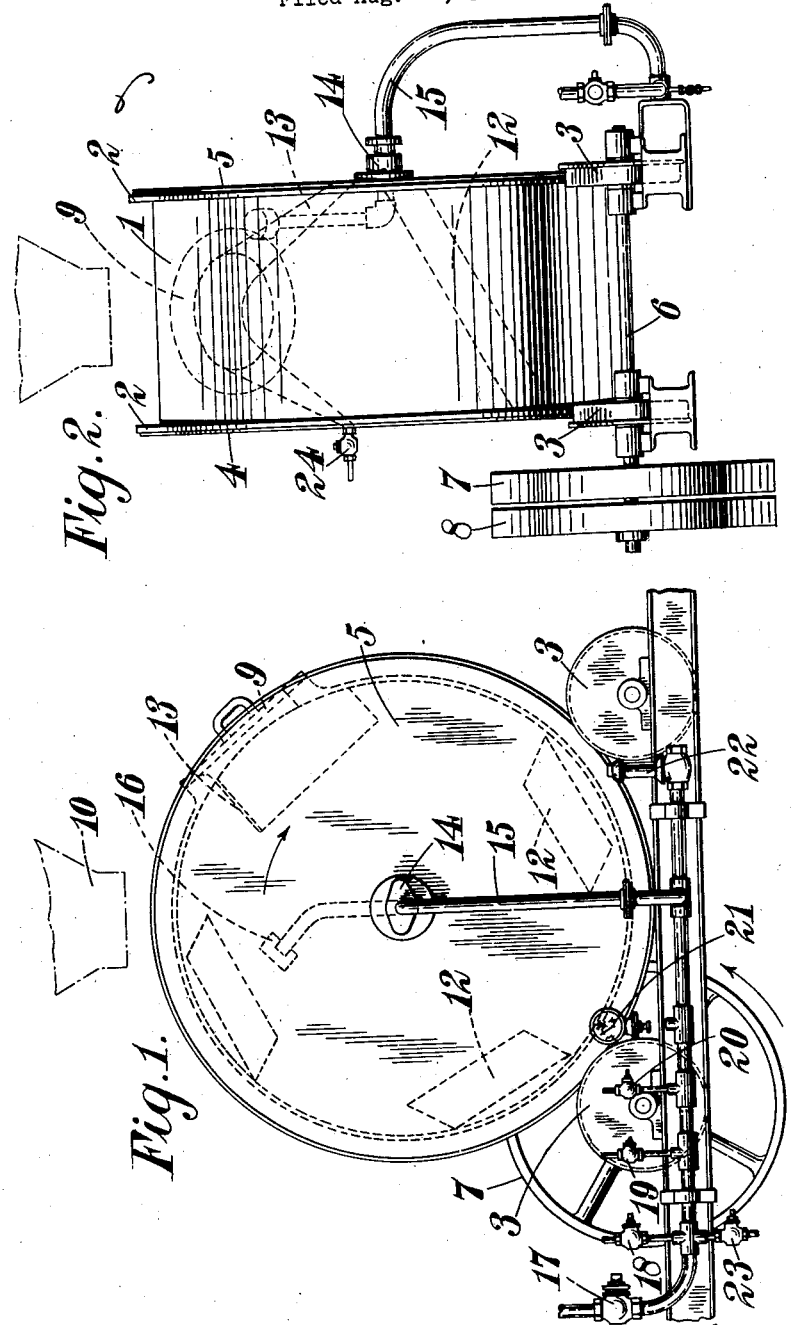

Patented Dec. 9, 1924.

1,519,014

UNITED STATES PATENT OFFICE.

WILLIAM WATSON AND DOUGLAS WILLIAM KENT-JONES, OF DOVER, ENGLAND, ASSIGNORS TO WOODLANDS LIMITED, OF DOVER, KENT, ENGLAND, A BRITISH COMPANY.

IMPROVER FOR FLOUR FOR BAKING BREAD AND METHOD OF MAKING.

Application filed August 25, 1921. Serial No. 495,293.

*To all whom it may concern:*

Be it known that we, WILLIAM WATSON and DOUGLAS WILLIAM KENT-JONES, subjects of the King of England, residents, respectively, of Dover, in Kent, England, have invented certain new and useful Improvements in an Improver for Flour for Baking Bread and Methods of Making, of which the following is a specification.

This invention consists in improvements in or relating to the manufacture of flour and bread, and one object is to provide an "improver," that is to say an agent which can be incorporated with flour or dough before baking into bread, for the purpose of improving the quality of the gluten and for stimulating the action of the yeast, and thus assisting in the production of a strong dough and a bold, well-risen loaf.

According to this invention flour is treated with a halogen or a compound containing available halogen, such as a haloid acid, until it has taken up sufficient halogen to enable it to be used as an improver to be incorporated with flour or dough before baking.

Thus according to this invention flour is immersed in chlorine gas, and the "chlorinated flour" thus prepared is used as an improver to be incorporated with flour or dough, before baking.

Previously it has been proposed, to employ gaseous chlorine in the bleaching and conditioning of flour, but the whole of the flour to be employed was subjected to the action of small quantities of dilute chlorine, merely sufficient to produce a bleaching effect.

It has also been proposed to supply the miller with cylinders of specially dehydrated chlorine for the treatment of the whole flour.

It is a characteristic feature of the chlorinated flour which we employ as an improver according to the present invention that it has had its nature and characteristics radically altered by the chlorination, as is shown by the fact that it is no longer suitable for use alone as the flour employed in baking bread. Indeed, the addition of as little as 2% of the chlorinated flour of the preferred strength to ordinary wheaten flour will make that flour incapable of producing pallatable bread.

The accompanying drawing illustrates one suitable form of apparatus for treating the flour according to the present invention.

In the drawing—

Figure 1 is an end elevation of the apparatus, and

Figure 2 is a side elevation.

The apparatus comprises a mild steel drum 1 of a sufficient capacity to hold say two sacks of flour. This drum is enamelled on the interior. It is provided with flanges 2 which run upon rollers 3. Cover plates 4, 5, bolted to the flanges, close the drum and upon the shaft 6 of one of the pairs of rollers 3 are mounted a fast and a loose pulley 7, 8, providing for the application of power to rotate the drum. The drum is rotated at a slow speed say 4 revolutions per minute.

A manhole is formed in the side of the drum provided with a cover 9, and a hopper 10 serves to charge the drum through the manhole when desired. The drum is provided with internal diagonal blades 12 agitating the flour, and a V-shaped blade 13 partly surrounding the interior of the manhole and serving to direct the flour thereto for discharge.

In the cover 5 there is provided a central gland 14 through which passes a pipe 15 which enters the drum and is bent upwardly therein towards the upper portion of the space within the drum where it is provided with a cowl or cover 16 to prevent flour from entering the pipe 15. The pipe 15 extends outside the drum to a number of branches provided with valves 17, 18, 19 and 20. There are also provided a pressure and vacuum gauge 21, a safety valve 22, and a drain 23.

The valve 17 is connected to a vacuum pump, the valve 18 to a compressed air-supply, the valve 19 to an ammonia cylinder and the valve 20 to a chlorine cylinder. A valve 24 is provided on the cover 4 of the drum 1 for the admission of air when desired.

An example of the method of working is as follows:—

The drum 1 is charged with two sacks (i. e.

560 pounds) of flour and the manhole 9 is screwed down. The drum and vacuum-pump are then set in motion and the valve 17 opened. When a vacuum of 20 inches is obtained (as recorded by the gauge 21) the pump is stopped and the valve 17 closed. The drum continues to revolve. The chlorine valve 20 is now slowly opened and left open for about ten minutes; by the end of that time the vacuum has dropped until it has become about six inches to eight inches and the chlorine cylinder has lost about sixteen pounds of chlorine. The chlorine is shut off when approximately sixteen pounds of it have been used. The drum 1 is revolved for a further ten to fifteen minutes to complete the absorption. During this period the vacuum rises a little to about twelve inches, owing to the further absorption of the chlorine.

The air valve 24 is now slightly opened and the vacuum pump re-started, whereby a current of air is drawn through the drum, sweeping away the unabsorbed chlorine. If the vacuum pump is arranged to discharge under water, the excess of chlorine is removed without difficulty or inconvenience. In about ten minutes the drum is sufficiently clear. It is then stopped, the vacuum pump stopped also and the manhole 9 opened. In case of great excess of chlorine being used, it is convenient to neutralize part of this by letting in some ammonia through the valve 19 before opening the valve 24 and starting the vacuum pump.

A closely-tied sleeve is now attached to the manhole and the drum is moved until the manhole 9 is at the bottom. The sleeve on being untied delivers the product into sacks. By slightly moving the drum in alternate directions (rocking it) the chlorinated flour can be completely emptied.

The compressed air supply forms an alternative method of clearing the drum of chlorine should the vacuum pump fail.

Most of the free chlorine which may be associated with the flour escapes when the chlorine in the drum is replaced by air but the treated flour contains from 2 to 3% of its weight in the form of combined chlorine. It is employed as an improver by adding say, ½ lb. to 1 lb. of the chlorinated flour per sack (280 lbs.) of untreated flour to the flour or dough before baking.

By further experiments we have found that an effective flour improver can be produced by the treatment with chlorine not only of wheat flour, but also of barley flour, rye flour, rice flour, pea and bean flours (such as soya bean flour) and other substances which are constituents of such flours (whether actually obtained from flour or not), such as starch, maltose, dextrine, albumen, semolina, tapioca, and the like.

Thus, according to this invention, any cereal or leguminous flour, or any solid substance which is a constituent of such flour, or which can be derived or prepared directly from any cereal or legume such as starch, or protein, (whether obtained from a cereal or legume or not and which in my broadest claims I have termed "flour") is treated with a halogen or a compound containing available halogen, such as a haloid acid, and the substance thus prepared is used as an improver to be incorporated with flour or dough before baking.

A proportion of the chlorine or the like reacts with the substance employed, and it appears from our experiments that those substances of the type referred to which are rich in protein matter, are most suitable for this purpose.

The following is an example of one method of carrying this part of the invention into effect. A quantity of soya bean flour is placed in the drum 1, into which is led commercially pure chlorine. The untreated flour is shaken or stirred by rotation of the drum to expose fresh surfaces to the action of the gas, and the treatment is continued until the flour has absorbed a sufficient proportion of chlorine. In one experiment, the quantity of fixed chlorine originally present in the natural flour was 0.07% and in the chlorinated flour 7.07% i. e. there was an increase of 7%. The treated material is then employed as an improver by adding, say ½ to 1 lb. of the chlorinated substance per sack (280 lbs.) of flour, to the flour or dough before baking.

We find that all flours after chlorination retain their fixed chlorine content for six months, and so presumably retain it indefinitely.

In practice we find it is preferable to use an apparatus from which air is first evacuated before the admission of the chlorine.

Further, we find that some flours, such as barley flour, may be reduced to a sticky mass by incorporating too much chlorine. In carrying out this invention, therefore, care must be taken that the treatment is not carried to such a point that the flour becomes sticky or gummy under the action of the chlorine.

There may be added to the chlorinated flour other improvers.

This invention has been exemplified by the preferred form of process in which gaseous chlorine is used. It will be understood that other halogens may be employed, such as bromine, but we do not, however, recommend the adoption of any other of the halogens or their compounds, as chlorine and its compounds are so much more fitted for use in an article of food in which the presence of their resultant products is perfectly normal, than are bromine, iodine, or their compounds, which are foreign to flour and which owing to their well known physiological effects carry risks not present with chlorine.

It will also be understood that in place of chlorine, compounds containing available halogen can be used, such as hydrochloric acid, preferably in gaseous form.

What we claim as our invention and desire to secure by Letters Patent is:—

1. A process for the production of a halogen-carrying improver for admixture with flour, consisting in subjecting a starchy substance to the action of halogen until it combines with a quantity of halogen insufficient to render the improver sticky or gummy but not less than half of one per cent by weight of the improver.

2. A process for the production of a chlorine-carrying improver for admixture with flour, consisting in subjecting a starchy substance to the action of chlorine until it combines with a quantity of chlorine insufficient to render the improver sticky or gummy but not less than half of one per cent by weight of the improver.

3. A process for the production of a chlorine-carrying improver for admixture with flour, consisting in subjecting flour to the action of chlorine until a constituent thereof combines with a quantity of chlorine equivalent to from substantially half of one per cent to substantially three per cent by weight of the improver.

4. A halogen-carrying improver prepared as a powder for admixture with flour, comprising a flour chemically combined with a quantity of halogen insufficient to render the powder sticky or gummy but equivalent to more than half of one per cent by weight of the improver.

5. A chlorine-carrying improver prepared as a powder for admixture with flour, comprising a flour chemically combined with a quantity of chlorine insufficient to render the powder sticky or gummy but equivalent to more than half of one per cent by weight of the improver.

6. A chlorine-carrying improver prepared as a powder for admixture with flour, comprising cereal flour, a constituent of which is chemically combined with a quantity of chlorine insufficient to render the powder gummy or sticky but equivalent to more than half of one per cent by weight of the improver.

7. A chlorine-carrying improver prepared as a powder for admixture with flour, comprising wheat flour, a constituent of which is chemically combined with a quantity of chlorine insufficient to render the powder gummy or sticky but equivalent to more than half of one per cent by weight of the improver.

In testimony whereof we have signed our names to this specification in the presence of two subscribing witnesses.

WILLIAM WATSON.
DOUGLAS WILLIAM KENT-JONES.

Witnesses:
   FREDK. J. SERGEANT,
   HORACE REILLY.